(12) United States Patent
Lenihan et al.

(10) Patent No.: US 6,169,843 B1
(45) Date of Patent: *Jan. 2, 2001

(54) RECORDING AND PLAYBACK OF AUDIO-VIDEO TRANSPORT STREAMS

(75) Inventors: Michael P. Lenihan, Sunnyvale; Sean C. Hart, San Jose; Mark Magee, Campbell; Brian Johnson, San Francisco, all of CA (US)

(73) Assignee: Harmonic, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/933,582

(22) Filed: Sep. 19, 1997

Related U.S. Application Data

(63) Continuation of application No. 08/566,283, filed on Dec. 1, 1995.

(51) Int. Cl.$^7$ .................................................. H04N 5/76

(52) U.S. Cl. .............................. 386/46; 386/95; 370/394

(58) Field of Search ................................... 386/1, 46, 111, 386/125, 126, 95; 370/352, 353, 357, 36, 394, 395; 348/423

(56) References Cited

U.S. PATENT DOCUMENTS

| | | | | |
|---|---|---|---|---|
| 5,396,497 | * | 3/1995 | Veltman | 348/423 |
| 5,420,866 | * | 5/1995 | Wasilewski | 370/110.1 |

(List continued on next page.)

OTHER PUBLICATIONS

A. Wasilewski, *MPEG–2 Systems Specification: Blueprint for Network Interoperability*, Comm. Tech., Feb. 1994.

D. LeGall, *MPEG: A Video Compression Standard for Multimedia Applications,*, Communications of the ACM, Apr. 1991.

(List continued on next page.)

* cited by examiner

Primary Examiner—Wendy Garber
Assistant Examiner—Aung S. Moe
(74) Attorney, Agent, or Firm—Proskauer Rose LLP (57) ABSTRACT

A method and apparatus for recording and playback of transport stream packets including multiplexed audio, video and other data streams. The transport streams may be generated in accordance with an MPEG-2 standard. In a record mode, an arrival timestamp is generated for each input transport packet to be recorded in a peripheral storage device. A given arrival timestamp indicates the arrival time of the corresponding transport packet in the recording system. Each of the transport packets are then stored with their corresponding arrival timestamps. The record mode may utilize a packet identifier (PID) decoder to perform packet filtering such that only incoming transport packets with selected PIDs are stored. In a playback mode, transport packets and corresponding arrival timestamps are retrieved from the storage device and the arrival timestamps are utilized to direct synchronous delivery of the transport packets to, for example, a decoder or a transport stream broadcast system. The playback mode may detect a timestamp discontinuity code in one or more of the arrival timestamps, and adjust the playback system time clock accordingly. The playback mode may also provide null packet interleaving in which a selectable number of null packets are inserted between each valid transport packet to thereby provide a selectable fixed-rate transport packet output. The recording and playback features may be implemented using a spooler card and a storage controller card incorporated into an otherwise conventional personal computer.

16 Claims, 8 Drawing Sheets

U.S. PATENT DOCUMENTS

| | | | |
|---|---|---|---|
| 5,467,342 | * 11/1995 | Logston et al. | 370/253 |
| 5,517,250 | * 5/1996 | Hoogenboom et al. | 348/467 |
| 5,521,907 | * 5/1996 | Ennis, Jr. et al. | 370/253 |
| 5,534,944 | * 7/1996 | Egawa et al. | 348/584 |
| 5,537,408 | * 7/1996 | Branstad et al. | 370/79 |
| 5,555,244 | * 9/1996 | Gupta et al. | 370/60.1 |
| 5,561,791 | * 10/1996 | Mendelson et al. | 370/253 |
| 5,566,174 | * 10/1996 | Sato et al. | 386/96 |
| 5,596,420 | * 1/1997 | Duam | 386/110 |
| 5,640,388 | * 6/1997 | Woodhead et al. | 370/468 |
| 5,790,543 | * 8/1998 | Cloutier | 370/395 |
| 5,835,668 | * 11/1998 | Yanagihara | 386/111 |

OTHER PUBLICATIONS

VideoPlex Product Literature, *MPEG–2 Playback Card Decoder, Professional Systems Network, Inc.*, Undated.

*M2S Media Spooler Control Panel, User Guide*, Rev. 0.9, Part No. 006–0008–001, Divicom Inc., May 2, 1995.

RECORDING AND PLAYBACK OF AUDIO-VIDEO TRANSPORT STREAMS

This is a continuation of application Ser. No. 08/566,283, filed Dec. 1, 1995.

FIELD OF THE INVENTION

The present invention relates to recording and playback of hierarchically organized audio-video signals. More particularly, the present invention relates to recording and playback of transport packets in a transport stream which includes multiplexed audio and video data streams from one or more data sources or programs.

BACKGROUND OF THE INVENTION

Many digital multimedia applications require efficient compression and transmission of video and audio information. A recently-developed international standard for compression and transmission of video and audio data streams is commonly known as MPEG-2. The MPEG-2 standard was developed by the International Standards Organization (ISO) Moving Pictures Experts Group (MPEG) and is documented in ISO/IEC DIS 13818-1, "Information Technology-Generic Coding of Moving Pictures and Associated Audio Information: Systems," ISO/IEC DIS 13818-2, "Information Technology-Generic Coding of Moving Pictures and Associated Audio Information: Video" and ISO/IEC Committee Draft 13818-3, "Information Technology-Generic Coding of Moving Pictures and Associated Audio Information: Audio." The above-cited ISO documents are incorporated herein by reference. The MPEG-2 systems specification provides a multi-layer hierarchical organization for multiplexing and transmission of video, audio and other types of program data streams, and is described in greater detail in A. Wasilewski, MPEG-2 Systems Specification: Blueprint for Network Interoperability, *COMM. TECH.*, Feb., 1994, which is incorporated by reference herein. The MPEG-2 video and audio specifications provide compression and encoding of video and audio data streams. MPEG-2 video compression is described in greater detail in D. Le Gall, MPEG: A Video Compression Standard for Multimedia Applications, *COMMUNICATIONS OF THE ACM*, April 1991, which is incorporated by reference herein.

The systems aspects of the MPEG-2 standard generally involve multiplexing several elementary streams from one or more programs to form a higher level packet-based stream. A given program may correspond to one or more television or motion picture signals and may include multiple elementary streams in the form of separately-encoded compressed video and audio data streams, as well as other program data streams such as closed caption text. The higher level packet-based stream in accordance with the MPEG-2 standard may be either a program stream or a transport stream. An MPEG-2 program stream generally carries a single program such that all elementary streams in the program stream share a common time base, while an MPEG-2 transport stream can carry elementary streams from multiple programs with different time bases. An MPEG-2 program stream generally uses variable-length packets and is intended for use in transmission applications with relatively low error rates. An MPEG-2 transport stream generally uses fixed length packets and includes error reduction and detection features.

The program and transport streams associate related elementary data streams for a given program or programs such that the elementary streams can be extracted, decoded and presented together in a coherent fashion. The program and transport streams may be recorded on or played back from a digital video disc (DVD), video tape, magnetic or optical disk drive or other suitable storage device. It should be noted that both program streams and transport streams may be considered part of a transport layer in accordance with the ISO network reference model as set forth in the ISO 7498 standard. The term "transport stream" as used herein is therefore intended to include both MPEG-2 program streams and transport streams as well as other packet-based data streams formed in accordance with non-MPEG standards.

Prior art recording and playback techniques for transport streams may utilize a predetermined constant bit rate to record or play back a transport stream. For example, a prior art video server may include a fixed-rate register structure which transmits or receives transport stream bits at a predetermined bit rate. The server thus delivers the transport stream to a storage device at the predetermined bit rate. Another prior art technique utilizes feedback from a destination device when delivering the transport stream. For example, a prior art video server may interact with a peripheral such as a storage device in a television set-top box to download a transport stream corresponding to a video-on-demand selection. If the rate at which the storage device can receive input data exceeds the transport stream data rate, the server must download the transport stream to the storage device in increments which the storage device can accommodate. The storage device may therefore be required to provide control signals to the server indicating when it is able to accommodate the next increment of the transport stream.

Although these prior art transport stream delivery techniques may be adequate for "off-line" downloading or playback to a single destination, they are generally not well-suited for numerous other multimedia applications in which transport stream data must be recorded and/or played back in real time and broadcast to multiple destinations. The latter include those applications in which transport stream data is to be broadcast via cable, telephone or computer network, satellite or other transmission medium to a number of remote users. For example, accurate real-time playback is generally required in a broadcast application in which commercials or other ads are inserted into a recorded transport stream program such that the recorded program and inserted ads may be broadcast to remote users. Other applications in which prior art recording/playback techniques are inadequate include video server applications with multiple streams at different rates, and playback of "speed changing" variable rate streams. The prior art techniques thus fail to provide adequate recording and playback of transport stream data to and from peripheral storage devices.

It is therefore an object of the present invention to provide improved techniques for recording and playback of transport streams. It is a further object to provide a transport stream recording and playback system which allows real-time recording and playback at rates suitable for use in a wide variety of multimedia applications.

SUMMARY OF THE INVENTION

These and other objects are achieved by the present invention. In accordance with one aspect of the invention, a recording method and apparatus are provided in which an arrival timestamp (ATS) is generated for each of a plurality of input transport packets to be recorded in a peripheral storage device. A given arrival timestamp indicates the arrival time of the corresponding transport packet in the recording system. Each of the plurality of transport packets are then stored with their corresponding arrival timestamps. A record mode of the present invention may also utilize a packet identifier (PID) decoder to perform a packet filtering function such that only incoming transport packets with particular PIDs are stored. The arrival timestamp may be generated using an MPEG-2 system time clock (STC) and may be configured in an MPEG-2 program clock reference (PCR) format. Alternatively, the arrival timestamp may be generated using PCRs included within the incoming transport packets.

Another aspect of the invention involves a playback method and apparatus which utilize arrival timestamps previously stored with a recorded transport packet. A time-corrected playback of previously-recorded transport packets is provided by delivering the transport packets in accordance with the corresponding arrival timestamps. A playback mode of the present invention may also involve detecting a timestamp discontinuity in one or more of the arrival timestamps, and adjusting the playback system time clock accordingly. These aspects of the invention provide improved playback synchronization in a variety of multimedia applications.

A further aspect of the invention involves a null packet interleave playback mode in which a desired fixed output rate is provided by transmitting one or more null packets between each valid transport packet. The number of null packets transmitted is determined in accordance with a null packet interleave ratio which may be specified by a system user. This aspect of the invention provides a user-selectable fixed-rate transport stream output and therefore improved compatibility with various types of output hardware.

The recording and playback features of the present invention may be readily implemented using a spooler card and a storage controller card incorporated into an otherwise conventional personal computer.

DETAILED DESCRIPTION OF THE INVENTION

Although the present invention will be illustrated below primarily in conjunction with MPEG-2 transport streams, the invention is more broadly applicable to MPEG-2 program streams as well as to packet-based data streams generated in accordance with standards other than MPEG-2. These other standards include, for example, the video and audio portions of the CCITT H.320 standard, and the audio coding standards of MPEG-1 and Dolby AC-3. The term "transport stream" as used herein should therefore be understood to include both MPEG-2 transport and program streams as well as any packet-based digital data stream which includes video, audio or other types of data, or various combinations thereof. The term "transport packet" refers to a packet within a transport stream. It should also be recognized that the invention is well-suited for use in a variety of applications, including terrestrial, CATV and satellite broadcasting and telephony-based multimedia services. Other suitable applications include MPEG video recorders, optical disk based digital recording systems and personal computers equipped with tape drives or other recording mechanisms. The invention may be implemented in a combined record/playback system, a record-only system or a playback-only system.

Figure 1A:
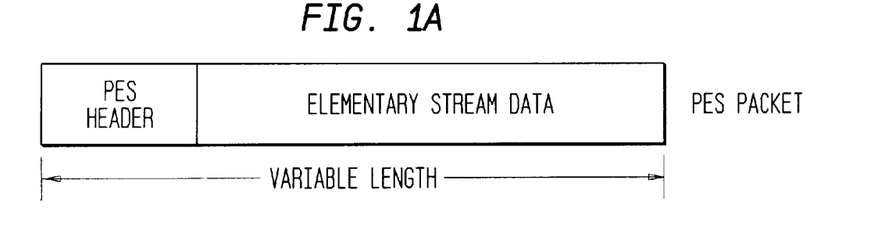
FIGS. 1A–1D show data formats in accordance with the MPEG-2 standard.

FIG. 1A shows an exemplary packetized elementary stream (PES) packet in accordance with the MPEG-2 standard. The PES packet has a variable length which may be as long as about 64 kbytes and includes a PES header and a quantity of elementary stream data. As noted above, the elementary stream data may correspond to an audio stream, a video stream or another type of data stream. The PES packet structure separates long elementary streams into more manageable units, and permits the attachment of timing, identification and control information to particular portions of an elementary stream. Each PES packet is typically separated into a plurality of fixed-length 188-byte transport packets.

Figure 1B:
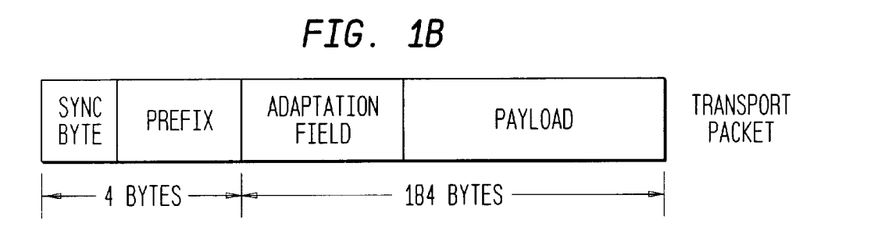

FIG. 1B shows an exemplary MPEG-2 transport packet. The packet includes a one-byte sync pattern, a three-byte prefix and a payload which may include a portion of the PES packet information shown in FIG. 1A. The exemplary transport packet shown also includes a variable-length adaptation field. The adaptation field may include, for example, program clock reference (PCR) and encryption key management information. The sync byte is a fixed pattern which permits identification of the beginning of each transport packet, and is 47H in the MPEG-2 standard. The prefix includes a thirteen-bit packet identifier (PID) which identifies the elementary stream carried by the corresponding transport packet. All PES-bearing transport packets with a given PID carry elementary stream data for only a single elementary stream and no other. The transport packet prefix also includes two adaptation field control bits which indicate whether the corresponding transport packet includes a payload with no adaptation field, an adaptation field with no payload, or both an adaptation field and a payload as shown in FIG. 1B. The prefix further includes a packet error indicator bit, a payload unit start indicator bit, a transport priority bit, two transport scrambling control bits and a four-bit continuity counter. The payload portion of the transport packet will include elementary stream data from a corresponding PES packet if the transport packet is of the PES-bearing type. The transport packet may also be of the program specific information (PSI) type or the private data type. A PSI-bearing transport packet does not include any portion of a PES packet and therefore does not include elementary stream data. Instead, the PSI-bearing packet includes information for correlating the various elementary streams associated with a given program, for identifying transport packets containing PCR information pertinent to a given program or elementary stream, and for performing other program specific functions.

Figure 1C:
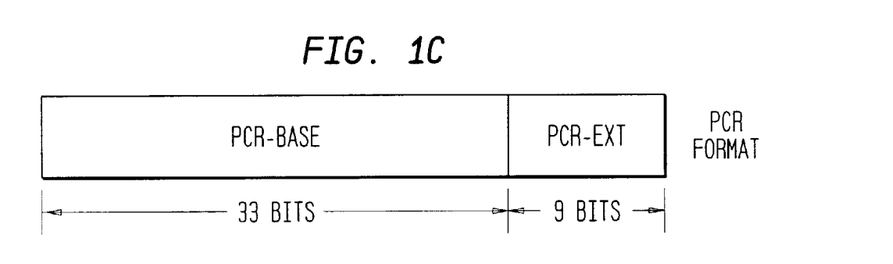

FIG. 1C shows the format of the PCR information which may be included in the adaptation field of a transport packet.

The PCR bits represent the value of the system time clock (STC) for a given program at the time when the PCR bits were inserted into the transport stream. Each program may have a different STC and therefore transport packets carrying elementary streams from different programs will generally have asynchronous PCRs. The PCR bits include thirty-three bits of PCR-BASE and nine bits of PCR-EXT. The PCR-EXT is a modulo-300 counter incremented at a clock rate of 27 MHz. The PCR-BASE is incremented after every 300 increments of the 27 MHz clock and thus represents a thirty-three bit counter operating at about 90 kHz. The PCR information is inserted into a transport packet during an encoding operation and is utilized in transport packet decoding to initialize and maintain the decoder system clock. Synchronization of audio, video and data streams within a given program is provided using the PCR information as well as presentation time stamps (PTSs) and decode time stamps (DTSs) which may be placed in the PES packet header.

Figure 1D:
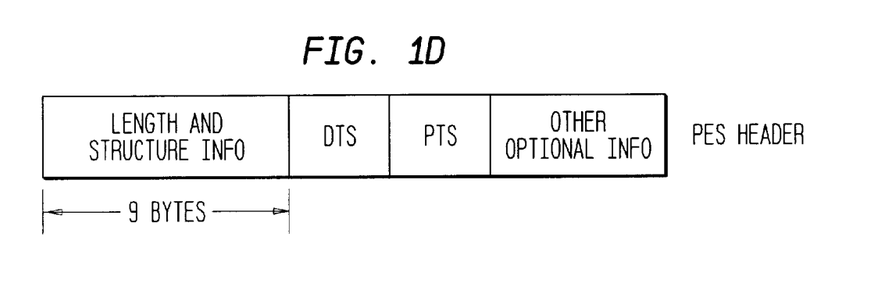

FIG. 1D illustrates an exemplary PES packet header which includes a DTS and a PTS as well as nine bytes of information indicating the length and structure of the corresponding PES packet. The DTS and PTS are generally formatted in the same manner as that shown for the PCR in FIG. 1C. The DTS and PTS are optional and need not be included in each PES header. The PES header also includes other optional information not directly relevant to the present invention. The DTS and PTS provide synchronization by indicating when particular audio, video or data streams within a given PES packet should be decoded and presented. The DTS and PTS may be utilized in a video PES packet which includes a particular video access unit such as an intrablock (I) picture, a predictive (P) picture, or a bidirectionally-predictive (B) picture. The DTS and PTS will then indicate to a decoder when to decode and display the corresponding video access unit. The PTS alone could be placed in a uncoded audio PES packet which includes the beginning of an audio frame to thereby indicate when the frame should be presented.

Figure 2:
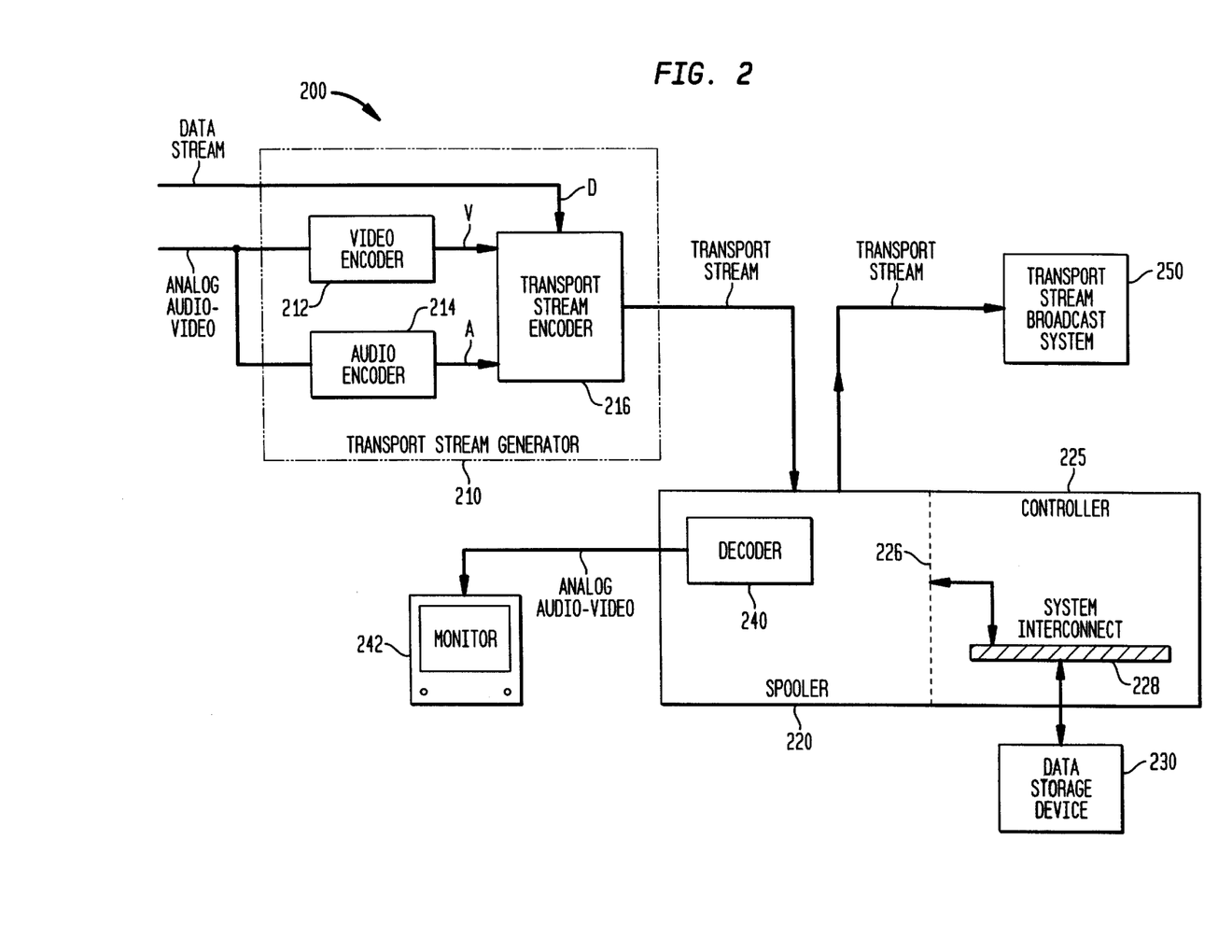
FIG. 2 is a block diagram of an exemplary transport stream recording and playback system in accordance with the present invention.

FIG. 2 shows an exemplary transport stream record/playback system 200 in accordance with the present invention. The system 200 includes a transport stream generator 210 which receives audio and video signal components of an analog audio-video signal, such as an NTSC, PAL or HDTV signal. The video signal component is converted to an SIF format which includes a luminance signal Y and chrominance signals $C_r$ and $C_b$. The formatted video signal is digitized and encoded in a video encoder 212. The audio signal component is digitized and encoded by an audio encoder 214. Encoded compressed video and audio is outputted from encoders 212, 214 to a transport stream encoder 216. A private data stream signal may also be supplied to the transport stream encoder 216. As noted above, such compressed video, compressed audio and private data signals are referred to herein as elementary streams. The transport stream encoder 216 may also receive elementary streams from a number of other programs.

The transport stream encoder 216 multiplexes the elementary streams of one or more programs into a transport stream which is supplied to a spooler 220. A controller 225 interfaces with spooler 220 via spooler interface 226. The term "spooler" as used herein refers generally to any device which delivers data to or from a storage controller during a recording or playback operation. The controller 225 includes a system interconnect 228 which may be the peripheral component interface (PCI) bus of a personal computer (PC). The controller 225 controls the flow of data between the spooler 220 and a data storage device 230 which may be, for example, a hard or floppy disk drive in a PC, a DVD or other recordable optical disk drive, or other suitable magnetic, optical or electronic memory devices. The spooler 22C) includes a decoder 240 which in this embodiment implements both transport stream decoding and video and audio decoding. An input FIFO buffer (not shown) may be included in decoder 240, and the decoder 240 may then be configured to clock input data at a different rate than the spooler 220. An exemplary transport stream decoder suitable for use in decoder 240 is described in U.S. patent application Ser. No. 08/497,690 entitled "Transport Stream Decoder/Demultiplexer for Hierarchically Organized Audio-Video Streams," which is assigned to the assignee of the present invention and incorporated by reference herein. The decoder 240 provides a decoded analog audio-video output signal to a monitor 242. The spooler 220 also provides a transport stream output which is supplied in this example to a transport stream broadcast system 250. As noted above, the broadcast system 250 could be, for example, a cable network, a computer network, a satellite network or a telephone network.

The spooler 220 is operative to record transport stream data in storage device 230 and to playback data recorded or otherwise stored in storage device 230. The spooler 220, controller 225 and data storage device 230 may be implemented as components of a PC. For example, the spooler 220 and controller 225 may be implemented as separate cards interfacing with the PCI bus of a PC. The controller card may be a PCI bus SCSI card with direct memory access (DMA) and an 8-bit SCSI-2 interface. The PC may be a Pentium PCI-bus 90 MHz PC with an Adaptec 2940/2940-W PCI bus SCSI adapter and an A/V SCSI hard disk with a capacity or the order of 1 Gbyte or more. A suitable software interface for directing the operation of spooler 220 and other system components is described in "M2S Media Spooler Control Panel User Guide," Rev. 0.9, Part Number 006-0008-001, May 2, 1995, available from Divicom Inc. of Milpitas, Calif. The record and playback modes of the present invention, as well as other operating modes such as a timestamp mode and a null packet interleave mode, may be user-selectable by loading suitable values into control registers (not shown) of the system controller 225 via the software interface. The control registers may be attached to a PCI bus or another suitable system interconnect.

Figure 3A:
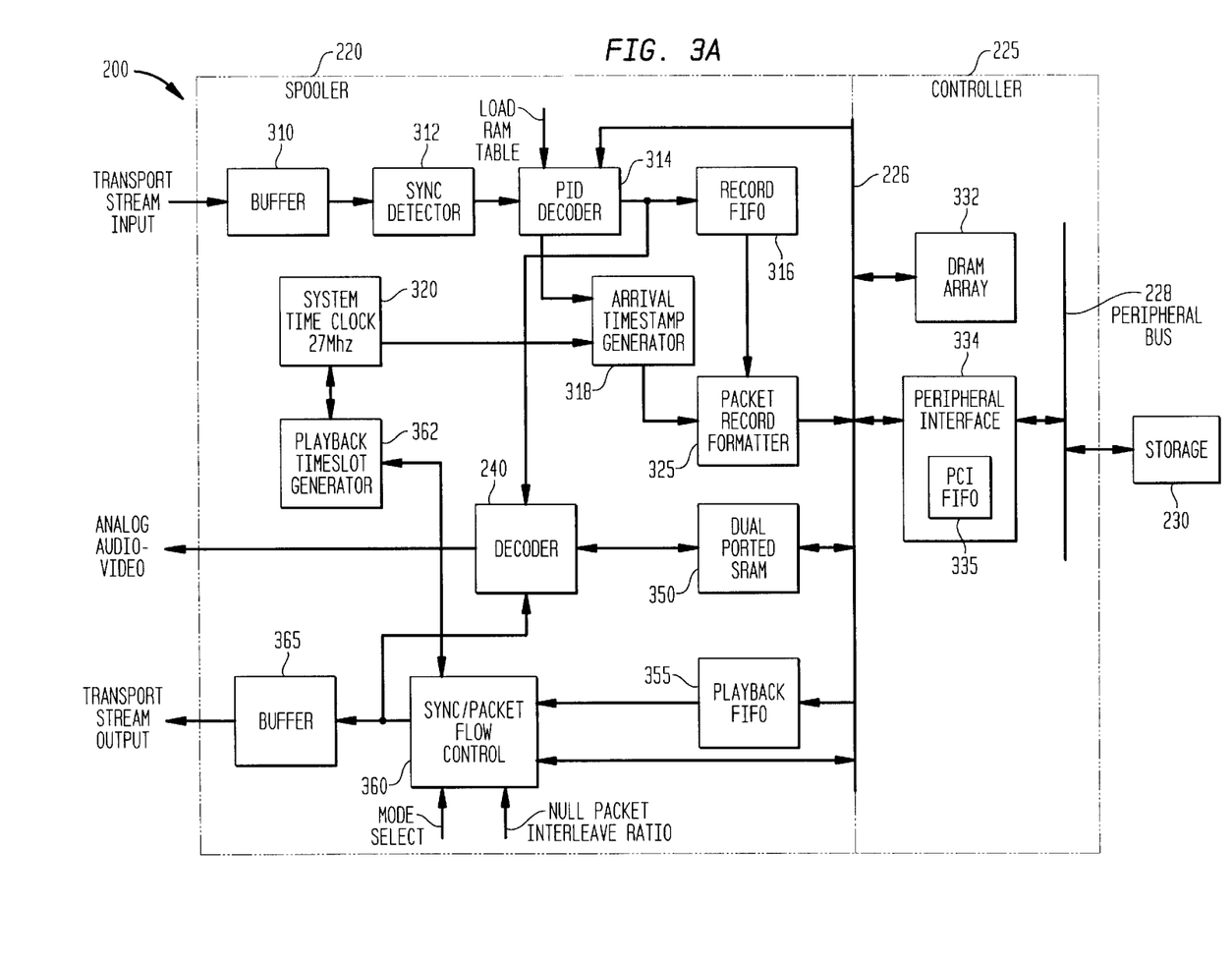
FIG. 3A is a block diagram showing the spooler and controller of FIG. 2 in greater detail.

FIG. 3A illustrates the recording and playback functions of system 200 in greater detail. The spooler 220 receives a transport stream in a buffer 310. The buffer 310 provides buffering for high-speed transport streams and may be configured in a conventional manner. The transport stream is applied to a sync detector 312 which detects the transport packet sync byte to identify the start of each incoming packet. The buffer 310 and detector 312 may be implemented as part of a HOTlinks interface available from Cypress Semiconductor. The HOTlinks interface provides a unidirectional high speed serial interface operating at a 27 Mbyte/s rate with data transmitted on every other clock cycle for an effective rate of 13.5 Mbyte/s or 108 Mbit/s. The HOTlinks interface may also be configured to detect a packet sync byte and to provide a special command code SC/D* to mark the start of a given transport packet. For example, driving an output SC/D* line to a logic high level could indicate presence of a packet sync byte while driving the SC/D* line to a logic low indicates packet data. The SC/D* line is provided as an output of the HOTlinks interface and may be utilized by subsequent circuitry as a packet sync indicator. It may also be desirable in certain embodiments to maintain a minimum number of byte clock cycles, such as a minimum of thirty of the 27 Mhz clock cycles, between each of the incoming transport packets in order to accommodate mismatch in the clocks of different system units. The spooler 220 may also include means for detecting and/or correcting bit errors, syntax errors or other errors in incoming transport packets. For example, the above-noted HOTlinks interface can provide an eight-bit to ten-bit encoding feature suitable for use in correcting transport packet bit errors. It should be noted that the spooler 220 could be suitably modified to accommodate inputs of various types, including asynchronous transfer mode (ATM) or modulated signal inputs. In addition, the spooler 220 can support both real-time and non-real-time inputs at various input data rates.

A PID decoder 314 identifies the incoming transport packets using the PID in the prefix portion of the transport packet header. The PID decoder may also implement a packet filtering function in accordance with the present invention by supplying only packets with certain predetermined PIDs to the recording portion of the system. For example, the PID decoder may include a memory look-up table with a list of PIDs for the packets to be recorded. The look-up table could be downloaded to a random-access memory (RAM) within PID decoder 314 from a PC in which the spooler 220 is implemented. The PID decoder 314 may also serve to remove or ignore any null packets in the incoming transport stream such that only valid packets are made available for recording. A copy of each packet appearing at the output of PID decoder 314 is supplied to decoder 240 as shown such that the input transport stream can be monitored. A record first-in first-out (FIFO) memory 316 provides temporary storage of one or more packets from decoder 314 before the packets are formatted for recording. An arrival timestamp (ATS) generator 318 receives from the PID decoder 314 a given transport packet identified as suitable for recording. The ATS generator 318 then generates an ATS indicative of the time at which the given packet was received relative to a system time clock (STC) 320. The STC 320 in this embodiment is a 27 Mhz MPEG-2 STC which supplies an STC signal to the ATS generator 318. The STC may be reset by, for example, supplying a suitable command over the PCI bus 228.

Figure 3B:
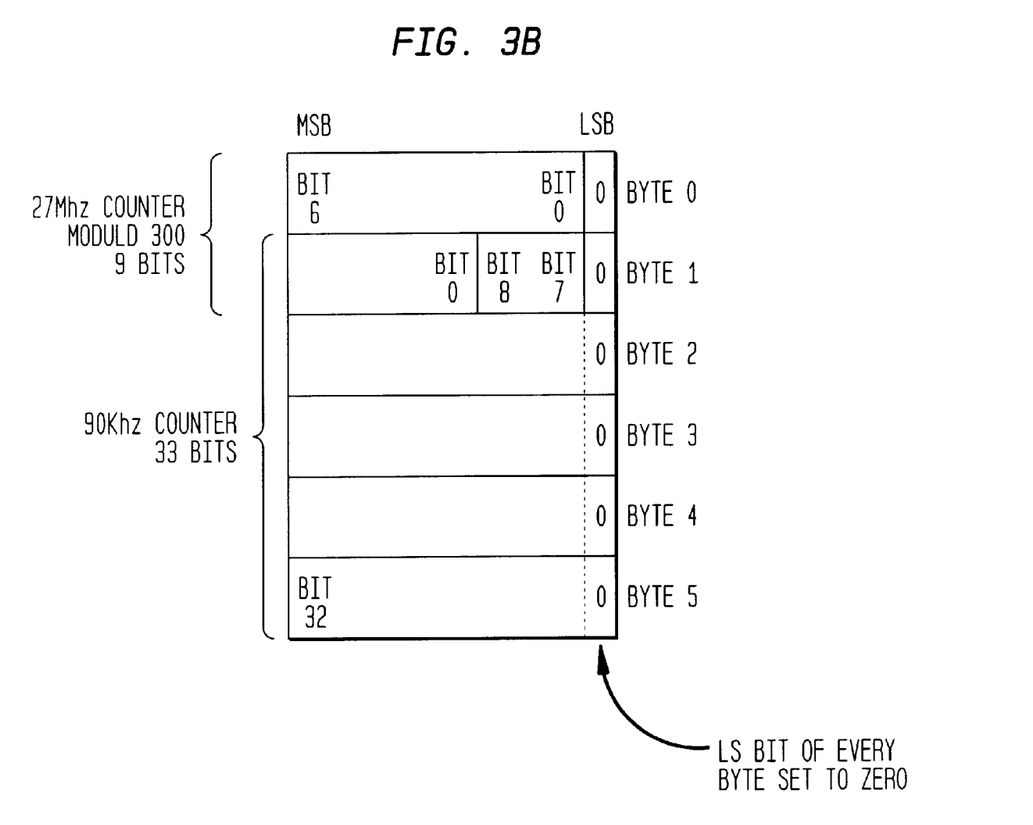
FIG. 3B illustrates the format of an exemplary arrival timestamp (ATS) in accordance with the present invention.

FIG. 3B shows the format of an exemplary ATS in accordance with the present invention. The ATS in this embodiment is provided as a six-byte field in a format similar to that described for PCR information in conjunction with FIG. 1C. As noted above, a PCR tracks time in 27 MHz clock cycles modulo 300 (PCR-EXT) and 90 kHz clock cycles (PCR-BASE). In embodiments of the invention in which an ATS is appended to, inserted in or otherwise associated with an MPEG-2 transport packet, the ATS should be designed to prevent confusion with the MPEG-2 sync byte value of 47H. One way to avoid confusion with the sync byte is to modify the PCR information as shown in FIG. 3B such that each of the six bytes in the ATS has a least significant bit (LSB) equal to zero. Because the PCR itself includes 42 bits, the exemplary ATS format of FIG. 3B requires 48 bits or six bytes. An ATS in accordance with the invention may also include other information suitable for use in regulating storage and/or playback of a transport stream. For example, storage could be regulated in accordance with virtual channel (VC) information captured from an input ATM stream. Such additional captured information could also be used to provide storage and/or playback regulation independently of the ATS.

Referring again to FIG. 3A, a packet record formatter 325 receives a given packet temporarily stored in record FIFO 316 and attaches the corresponding ATS to that packet to provide a formatted packet. The ATS is generally appended to the beginning or end of the transport packet, but in other embodiments could be inserted in the packet header or payload by the record formatter 325. The formatted packet is then passed across spooler interface 226 to a local storage element which in this embodiment is implemented as a dynamic random access memory (DRAM) array 332. The spooler interface 226 may include, for example, a 32-bit DRAM bus and an 8-bit control bus. The formatted packet is read from the DRAM array 332 to a peripheral interface 334 which may be a PCI interface including a PCI FIFO 335. The PCI interface 334 supplies the packet to storage device 230 via system interconnect 228 which in this embodiment is a PCI bus or other peripheral interconnect bus. A given transport packet is thus stored in storage device 230 along with its corresponding ATS. As will be described in greater detail below, the ATS of the present invention provides numerous advantages such as significantly improved flexibility in both recording and playback of transport packets.

Transport packets may be played back from the storage device 230 by supplying the packets via peripheral bus 228 to peripheral interface 334. The peripheral interface directs transfer of the packets across spooler interface 226 to a decoder communication port which in this embodiment is a dual-ported static random access memory (SRAM) 350. The packets may then be supplied to decoder 240 which decodes the packets to provide an analog audio-video output signal as described above. The packets are also supplied to a playback FIFO 355 which provides temporary storage of one or more playback packets while the packets are configured in a desired playback arrangement. A sync/packet flow control unit 360 receives playback packets from the spooler interface 226 and a timing signal from a playback timeslot generator 362. The control unit 360 identifies a given packet using the sync byte and determines when the given packet should be played back using, for example, an ATS attached to the packet during a record operation. The flow control unit 360 also utilizes the timing signal and mode select commands to determine a suitable sequence of packet playback. For example, a fixed-rate mode of operation to be described in greater detail below provides playback in accordance with a user-specified null packet interleaving ratio. The playback hardware of spooler 220 can support playback at a variety of data rates, including rates faster or slower than real-time, and in various alternative output formats. In addition, the packets to be played back may be received from other storage devices or external sources in addition to or in place of storage device 230. The spooler 220 can be configured to synchronize playback of transport packets from such multiple sources.

The transport packets to be played back are supplied from flow control unit 360 via an output buffer 365 to a transport stream output at a desired bit rate. The buffer 365 may be part of a unidirectional serial HOTlinks interface as described above, and may provide the output transport stream at a rate of about 13.5 Mbytes/s or 108 Mbits/sec. Of course, the present invention may be utilized at other data rates as required by a given application. The transport packets may also be supplied with or without attached ATSs to decoder 240 for playback on monitor 242 or other suitable playback device. The decoder 240 could be synchronized to external video or local video sources. The playback techniques of the present invention may utilize information from the decoder 240 to regulate placement of transport packets in the output transport stream. For example, PCR information recovered from the playback transport stream within decoder 240 could be used to provide synchronization between previously-recorded video and local video for use in applications such as the above-mentioned ad insertion.

Figure 4A:
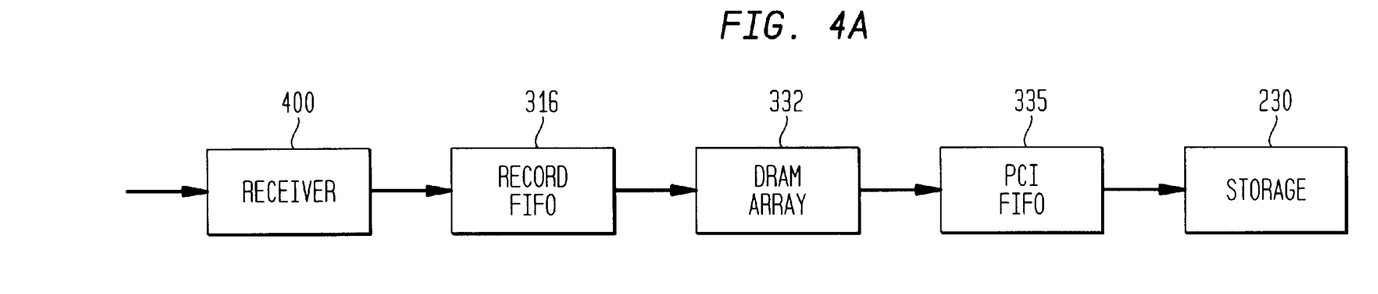
FIG. 4A illustrates transport packet movement through the exemplary system of FIG. 2 in the recording mode.

FIG. 4A illustrates the movement of transport packets through system 200 in a record mode in accordance with one embodiment of the invention. The transport packets initially pass through a receiver 400 which includes buffer 310, sync detector 312, PID decoder 314 and ATS generator 318. The packets are then written to a temporary storage element in the form of record FIFO 316. A local storage element in the form of DRAM array 332 receives the packets previously stored in record FIFO 316. The packets are then transferred from DRAM array 332 to PCI FIFO 335 in the above-described peripheral interface 334. Finally, the packets are recorded in storage device 230. Although the temporary, local and interface storage elements are illustrated in this embodiment as record FIFO 316, DRAM array 332 and PCI FIFO 335, respectively, it should be understood that numerous alternative memory arrangements may be utilized. For example, these elements could be portions of a single memory unit in the form of a static or dynamic RAM, a magnetic memory or an optical memory. Also, one or more of the intermediate temporary, local and interface storage elements may be eliminated in alternative embodiments.

Figure 4B:
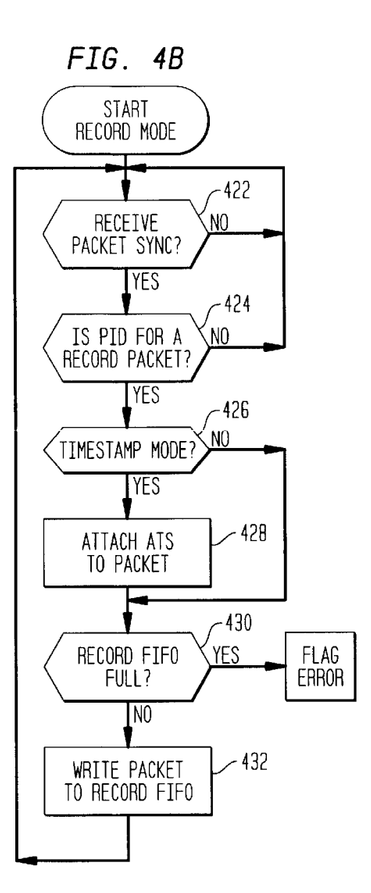
FIGS. 4B–4F are flow diagrams illustrating the operation of transport stream recording in accordance with an exemplary embodiment of the present invention.

FIG. 4B is a flow diagram illustrating the operation of receiver 400 of FIG. 4A during the record mode. The record mode process starts with step 422 in which a determination is made as to whether a transport packet sync byte has been received. As noted above, packet sync could also be provided by detecting special commands such as SC/D* which may be inserted by an element of receiver 400. The process waits until a packet sync is detected and then proceeds to identify the incoming packet using its PID. In step 424 a decision is made regarding whether the PID corresponds to a PID designated for recording. This may be accomplished by comparing the PID of the incoming packet with a look-up table of predetermined PIDs for packets which are to be recorded. If the PID indicates that the packet is not to be recorded, the packet may be discarded by not writing it to any particular destination and returning the process to step 422 to await the next valid transport packet. If the PID indicates that the packet is to be recorded, a determination is made in step 426 as to whether the spooler 220 is in a timestamp mode. As noted above, a user may select the timestamp mode as one of a number of different operating modes for system 200, and the mode selection may be entered in a control register of a PCI bus. In the timestamp mode, an ATS indicating the arrival time of the packet is generated and attached to the packet as indicated in step 428. As noted in conjunction with FIG. 3B above, the ATS may be a six-byte field arranged in a PCR format and attached to the beginning of the packet. If the timestamp mode is not selected, the process skips step 428 as shown. In step 430 a determination is made as to whether the record FIFO 316 is full. If the record FIFO is full, a flag error is generated. If the record FIFO is not full, the packet is written to the record FIFO which, as noted above, provides temporary storage for one or more incoming packets. The process then returns to step 422 to await the next packet in the input transport stream.

Figure 4C:
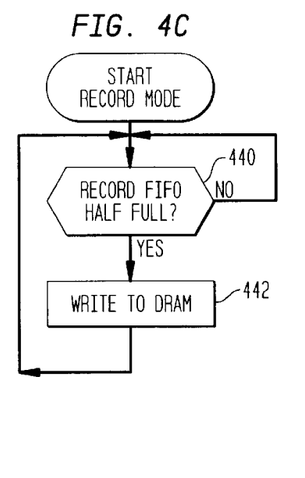
Figure 4D:
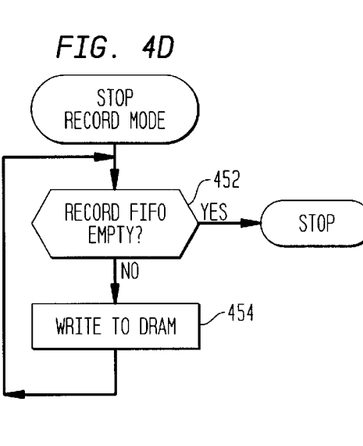

FIGS. 4C and 4D are flow diagrams illustrating the interaction between record FIFO 316 and DRAM array 332 during record mode. FIG. 4C indicates that a determination is made in step 440 after the start of the record process as to whether the record FIFO is half full. If the record FIFO is half full, the process directs the contents of the record FIFO to be written to DRAM as shown in step 442. If the record FIFO is not half full, the process waits until a sufficient number of transport packets have been stored in the record FIFO. FIG. 4D indicates that when the record mode is stopped, a determination is made in step 452 as to whether the record FIFO 316 is empty. If the record FIFO is empty, all of the transport packets to be recorded during the recording process have already been transferred to the DRAM array 332, and the process stops. If the record FIFO is not empty, the contents are written to DRAM as indicated in step 454 and the process returns to step 452.

Figure 4E:
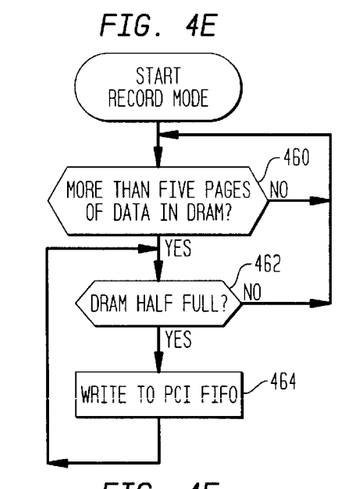
Figure 4F:
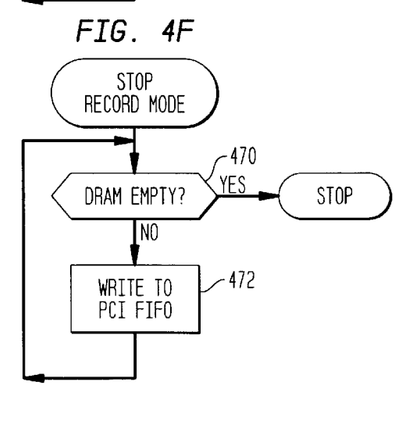

FIGS. 4E and 4F are flow diagrams illustrating the interaction between DRAM array 332 and PCI FIFO 335 during record mode. FIG. 4E indicates that after the start of the record process a determination is made as to whether there are five or more pages of transport packet data stored in the DRAM array 332, wherein a page of data in this exemplary embodiment includes 128 data words each with four bytes. If there are less than five pages of transport packet data in the DRAM array, no further action is taken. Once there are more than five pages of data in DRAM array, step 462 indicates that a determination is made as to whether or not the DRAM array is half full. If the DRAM array is not yet half full, the process returns to step 460. If the DRAM array is half full, the DRAM data is written to PCI FIFO 335 as shown in step 464. FIG. 4E indicates that when the record mode is stopped, a determination is made in step 470 as to whether the DRAM array is empty. If the DRAM array is empty, all transport packets which were to be recorded during the record mode have already been transferred to the PCI FIFO, so the record process is stopped. If the DRAM array is not empty, the contents of the DRAM array are written to the PCI FIFO 335 as shown in step 472, and the process returns to step 470. Of course, it should be recognized that in this and other embodiments of the invention, any of a number of alternative conditions may be utilized to indicate transfer of packets between system memory elements.

Figure 5A:
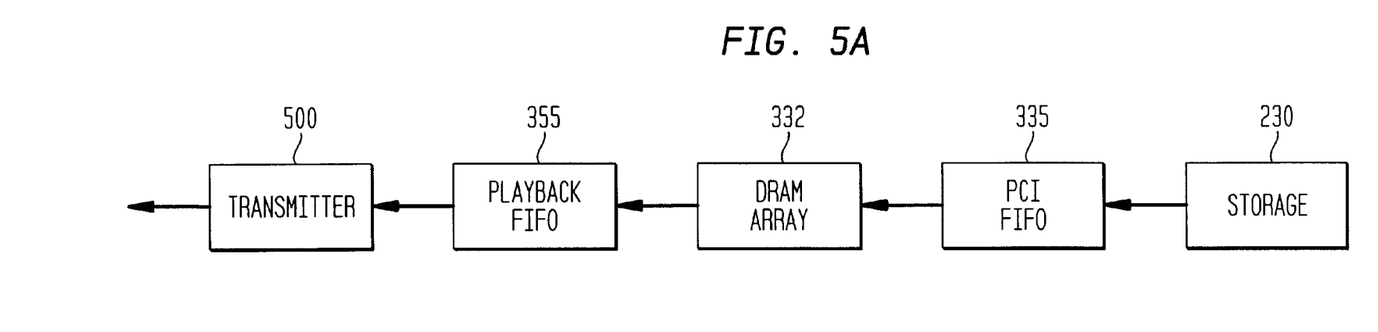
FIG. 5A illustrates transport packet movement through the exemplary system of FIG. 2 in the playback mode.

FIG. 5A illustrates the movement of transport packets through system 200 in a playback mode in accordance with the invention. The transport packets are stored in storage device 230 and are retrieved therefrom into PCI FIFO 335. From the PCI FIFO the playback packets are transferred to DRAM array 332. From the DRAM array the packets are transferred to playback FIFO 355. The packets are supplied from playback FIFO 355 to a transmitter 500 which includes in this embodiment the sync/packet flow control unit 360 and buffer 365. The retrieved packets may be transmitted to decoder 240 or to the transport stream broadcast system 250 as shown in FIG. 2. Again, it should be noted that the playback packet flow is exemplary and that one or more of the intermediate temporary, local and interface storage elements may be eliminated in alternative embodiments.

Figure 5B:
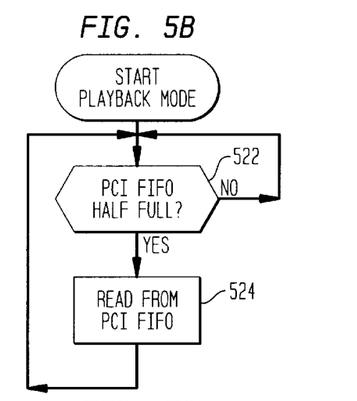
FIGS. 5B–5F are flow diagrams illustrating the operation of transport stream playback in accordance with an exemplary embodiment of the present invention.

FIG. 5B is a flow diagram illustrating the interaction between the PCI FIFO 335 and the DRAM array 332 during a playback operation. The transport packets to be played back are retrieved from storage device 230 into PCI FIFO 335 at the start of playback mode. In step 522, a determination is made as to whether the PCI FIFO is half full. If the PCI FIFO is not half full, transfer of packets to the DRAM array 332 is delayed until more packets are transferred into the PCI FIFO as indicated by return of the process to step 522. If the PCI FIFO is half full, the playback packets are read from the PCI FIFO 335 into the DRAM array 332 as shown in step 524. This permits accumulation of a desired number of transport packets in PCI FIFO 335 before a transfer to DRAM array 332 is carried out.

Figure 5C:
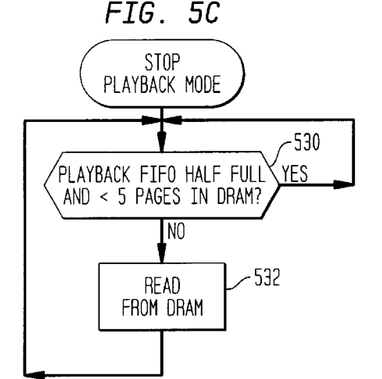
Figure 5D:
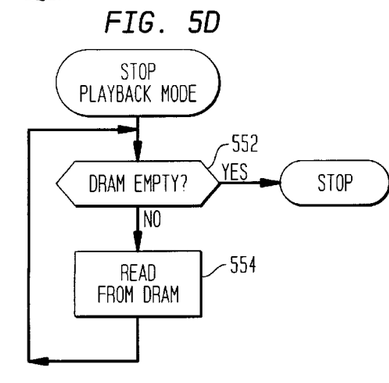

FIGS. 5C and 5D are flow diagrams illustrating the interaction between DRAM array 332 and playback FIFO 355 in a playback operation. FIG. 5C shows that after the start of a playback mode, step 530 determines if the playback FIFO 355 is half full and if there are less than five pages of data stored in DRAM array 332. If these two conditions are met, the process remains in step 530 until additional transport packets are transferred out of the playback FIFO and into the DRAM array such that the conditions are no longer met. When the playback FIFO is less than half full, and the DRAM array has a sufficient number of packets, step 532 indicates that transport packet data is read from DRAM array 332 into playback FIFO 355. FIG. 5D shows that after a command is received to stop the playback mode, a determination is made in step 552 as to whether the DRAM array 332 is empty. If the DRAM array is empty, the playback process is stopped as shown. If the DRAM array is not empty, data is read from the DRAM array as shown in step 554 and the process returns to step 552 until all transport packets associated with the playback operation are transferred through the DRAM array.

Figure 5E:
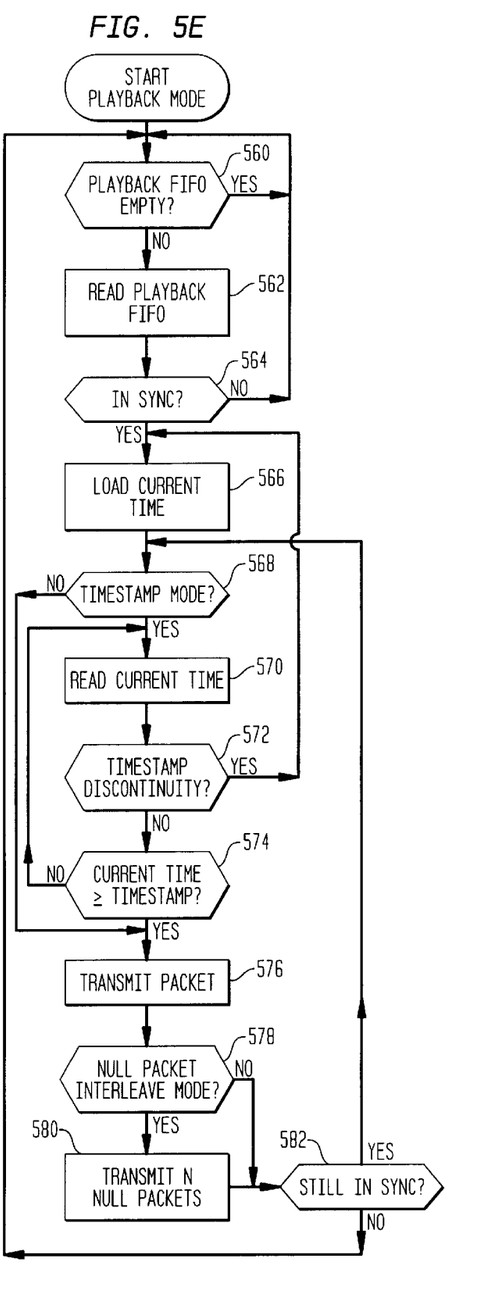

FIG. 5E is a flow diagram illustrating the interaction between the playback FIFO 355 and transmitter 500 during playback mode. At the start of playback mode, a determination is made in step 560 as to whether or not the playback FIFO is empty. If the playback FIFO is empty, no further action is taken until one or more transport packets arrive in the playback FIFO. When at least one transport packet arrives in the playback FIFO, the packet is read from the playback FIFO as shown in step 562. The flow control unit 360 in transmitter 500 then determines if a given packet is in synchronization with a transport stream by, for example, detecting a sequence of sync bytes for two or more consecutive packets as described below in conjunction with FIG. 5F. If the given packet is not in synchronization, the process returns to step 560 to await the next transfer packet. If the given packet is in synchronization, the STC 320 is initialized in step 566 by loading the current time, as indicated by an ATS associated with the given packet, into the STC 320 via playback time slot generator 362. A determination is then made in step 568 as to whether the spooler 220 is in a timestamp playback mode. If the spooler is in timestamp mode, the current time as presently indicated by the STC 320 is read out as shown in step 570. A determination is then made in step 572 as to whether or not a timestamp discontinuity exists. A timestamp discontinuity in accordance with the present invention is indicated by the presence of a predetermined timestamp code such as six bytes of FFH. The timestamp discontinuity code may be inserted into a particular transport packet by, for example, ATS generator 318 and/or record formatter 325 during the previously-described recording operations. The predetermined timestamp code indicates that a time discontinuity exists within a series of subsequent transport packets. The packet with the predetermined timestamp code may be, for example, either processed in a manner to be described below or discarded. The ATS value from the immediately following transport packet is then loaded into STC 320 as the current time in step 566. The process then continues with steps 568, 570 and 572. This timestamp discontinuity feature of the present invention permits transport packets to be delivered to a playback device continuously without requiring alteration in the previously-stored ATS values.

An alternative technique for detecting a timestamp discontinuity involves using the extra six bits in the six-byte ATS of FIG. 3B. The extra six bits can be configured not only to distinguish the 47H sync byte as described previously but also to provide a timestamp discontinuity code indicating whether the corresponding packet should be played contiguously with a prior packet or at a different time. For example, one value of the six bit code will indicate to the system that the corresponding packet will be played contiguously with other subsequent packets. Another value of the six bit code will indicate that the corresponding packet is a discontinuous packet, such that the STC 320 could be restarted or set to a different value for playback of that packet as well as subsequent packets.

If there is no further timestamp discontinuity, a comparison is made in step 574 to determine if the current time is greater than or equal to the transport packet ATS. The comparison may be made by loading the current time from the STC 320 in PCR format and the ATS in PCR format into registers and then supplying the values to a 42-bit wide magnitude comparator. An additional carry bit may be utilized in each register as a pseudo-MSB to accommodate rollover conditions. If the current time is not greater than the packet ATS, the process repeats steps 570, 572 and 574 for that transport packet until the current time equals or exceeds the packet ATS. When this occurs, the process moves to step 576 and the packet is transmitted either to decoder 240 or via buffer 365 to the transport stream broadcast system 250. The timestamp mode of playback operation thus permits delivery of an output playback packet at a time corresponding to the original arrival time for that packet.

After a packet is transmitted as shown in step 576, a determination is made in step 578 as to whether the spooler 220 is in a null packet interleave mode. If the packet is in this interleave mode, an additional N null packets are transmitted as shown in step 580. The additional packets are transmitted immediately following the packet transmitted in step 576. The number N is determined from the user-selectable null packet interleave ratio supplied to the flow control unit 360 as shown in FIG. 3A. For example, if a user selects an output transport packet data rate which is approximately $\frac{1}{100}$ of the 108 Mbit/s system data rate used in this embodiment, the number N would be set to 99 to thereby provide the desired output data rate for valid transport packets. The null packet generally includes a sync byte and a predetermined null packet PID of 1FFFH. The present invention can accommodate a wide variety of different user-selectable playback rates using the above-described null packet interleave feature. If the spooler 220 is not in null packet interleave mode, the process of FIG. 5E skips step 580 and moves directly to the step 582. A determination is made in step 582 as to whether or not the system is still in synchronization by detecting a sync byte for one or more subsequent packets. If the system is not in synchronization, the process returns to step 560 to process the next transport packet in the playback FIFO 355. If the system is in synchronization, the process returns to step 568 as shown to process another transport packet for transmission.

Figure 5F:
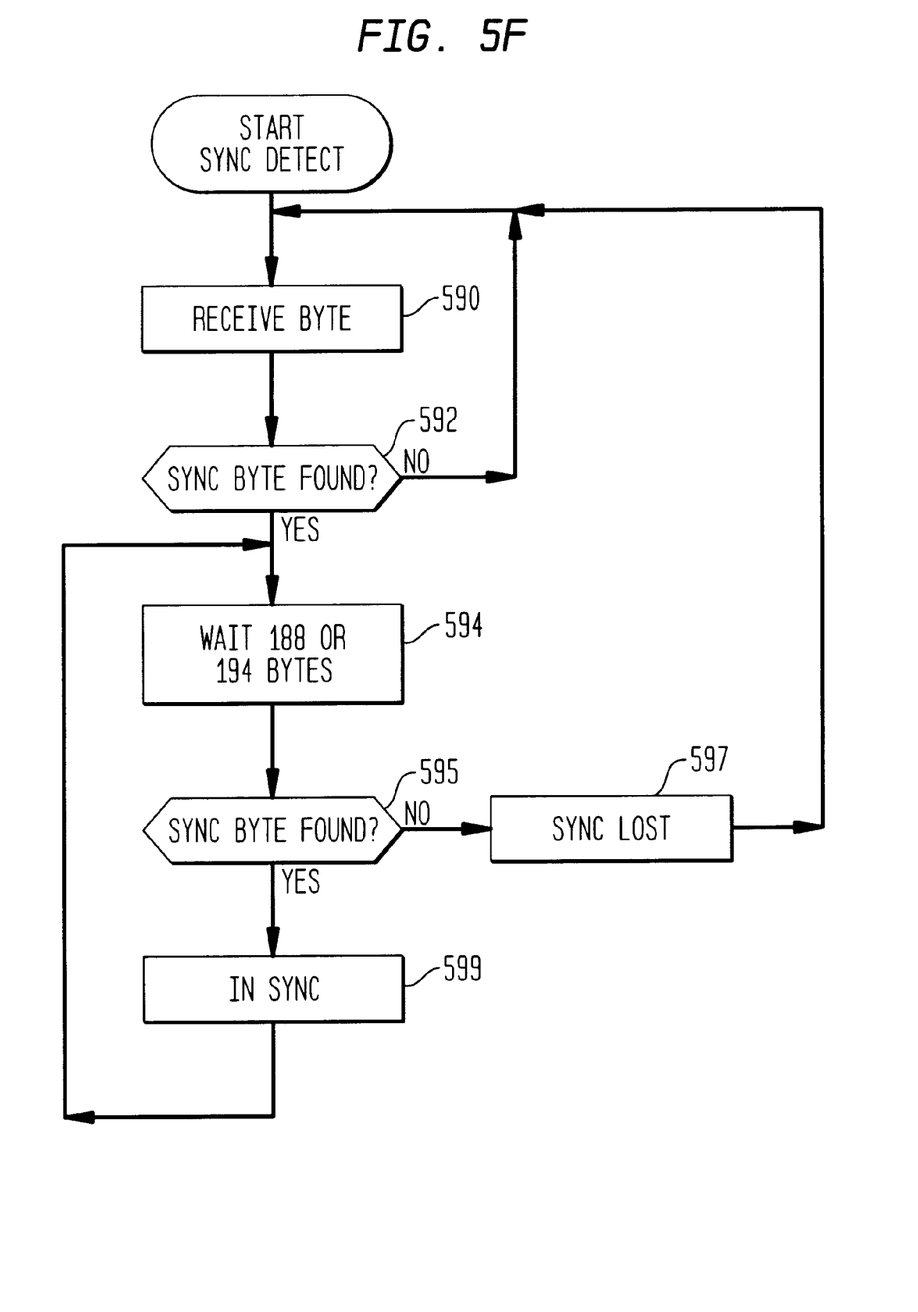

FIG. 5F illustrates an exemplary set of processing steps for determining if the playback transport stream is in synchronization as required in steps 564 and 582 of FIG. 5E. The sync detect process receives a particular input byte in step 590 and attempts to identify it as a sync byte in step 592. If the incoming byte is not the sync byte, the process returns to step 590 to await the next byte. If the incoming byte is the sync byte, the process waits to receive either 188 or 194 more bytes until the next expected sync byte as shown in step 594. The next sync byte will be 188 bytes away if the corresponding transport packet does not have a six-byte ATS attached thereto as described above or 194 bytes away if the transport packet does have the six-byte ATS. In step 595, a determination is made as to whether the next sync byte was found as expected. If the next sync byte is not found, system synchronization is considered lost, and the process returns to step 590. If the next sync byte is found, the system is considered in synchronization and the process returns to step 594 to monitor sync bytes for subsequent packets. Because this exemplary sync detection process does not verify sync until a second sync byte is detected, the packet corresponding to the first sync byte may be lost. This can be prevented by, for example, suitable storage of a null packet with a group of packets during a recording operation, or by loading one or more discontinuity packets into the PCI FIFO before a particular transport stream is played back.

The present invention utilizes an ATS appended to, inserted in or otherwise associated with a given transport packet during a record operation to provide proper synchronization on playback in the manner described above. Alternatively, the present invention could utilize other types of timing information, including PCRs, PTSs and DTSs, to provide proper playback synchronization for packets recorded without ATSs. The ATS of the present invention reflects the arrival rate of transport packets in a recording system. In an alternative embodiment, the arrival rate could be calculated by processing the PCR information for a series of arriving packets which include PCRs. A timestamp in accordance with the present invention is therefore intended to include time information which is derived from PCRs. The term "arrival timestamp" as used herein should be understood to include these and other alternative indicators of transport packet arrival time.

An ATS in accordance with the invention may be generated using PCRs of an incoming transport stream in the following manner. The incoming transport stream is parsed or otherwise monitored to identify two or more consecutive PCRs. The number of bytes between two of the PCRs are then counted, and the resulting count is processed to calculate an effective arrival rate of the incoming stream. The arrival rate may then be used to generate one or more appropriate ATSs suitable for storage with corresponding transport packets.

The present invention may also utilize PCRs in place of the above-described ATSs to provide playback of stored transport packets at a desired rate. For example, a retrieved transport stream could be parsed to identify at least two consecutive PCRs in the stream. The number of bytes between the two PCRs are then counted, and the resulting count is used to calculate a delivery rate for the bytes between the two PCRs. The parsing and rate determination functions could be provided by, for example, a suitable processor incorporated into the sync/packet flow control unit 360 or elsewhere in spooler 220 of FIG. 3A. Additional buffering would generally be provided in such an embodiment in order to hold the bytes between PCRs prior to their delivery at the calculated rate.

It should be understood that the foregoing description is merely illustrative of the invention. Numerous alternative embodiments may be devised by those of ordinary skill in the art without departing from the scope of the following claims.

What is claimed is:

1. A method of playing back transport packets in a transport stream playback system comprising the steps of:

retrieving from storage each of a plurality of formatted packets, including a transport packet with synchronization word, a corresponding formatted arrival timestamp, the arrival timestamp indicative of an arrival time of the corresponding transport packet in a recording system used to store the formatted packets;

distinguishing between said arrival timestamps and said synchronization words based on a bit pattern format of said arrival timestamps which is unambiguously free of any bit pattern that matches said synchronization pattern;

determining if one of the plurality of packets includes a timestamp discontinuity;

altering a playback system time clock in accordance with an identified timestamp discontinuity; and delivering the transport packets in one or more transport streams in accordance with the corresponding arrival timestamps relative to an independent playback system time clock, wherein the independent playback system time clock is loaded with the arrival time stamp of the transport packet with a playback discontinuity.

2. The method of claim 1 wherein the step of determining if one of the plurality of packets includes a timestamp discontinuity further includes the step of identifying a predetermined code placed in the arrival timestamp of the corresponding packet.

3. The method of claim 1 wherein the step of altering a playback system time clock in accordance with an identified timestamp discontinuity further includes the step of resetting the playback system time clock to a value corresponding to an arrival timestamp of the packet for which the discontinuity was identified.

4. The method of claim 1 wherein the step of altering a playback system time clock in accordance with an identified timestamp discontinuity further includes the step of resetting the playback system time clock to a value corresponding to an arrival timestamp of a packet arriving in the playback system subsequent to the packet for which the discontinuity was identified.

5. The method of claim 1 wherein the step of delivering transport packets further includes the additional step of delivering a predetermined number of null packets between delivery of each of the transport packets retrieved from storage.

6. An apparatus for use in playing back transport packets in a transport stream playback system, the apparatus comprising:

a controller for retrieving each of a plurality of formatted packets, including a transport packet having a synchronization word, and corresponding formatted arrival timestamps from a system storage device, each arrival timestamp indicative of an arrival time of the corresponding transport packet in a recording system used to store that formatted packet, for distinguishing between said arrival timestamps and said synchronization words based on a bit pattern format of said arrival timestamps which is unambiguously free of any bit pattern that matches said synchronization pattern, for determining if one of the plurality of packets includes a timestamp discontinuity, and for altering a playback system time clock in accordance with an identified timestamp discontinuity; and a spooler operative to deliver the retrieved transport packets in one or more transport streams in accordance with the retrieved arrival timestamps relative to an independent playback system time clock, wherein the independent playback system time clock is loaded with the arrival time stamp of the transport packet with a playback discontinuity.

7. The apparatus of claim 6 wherein the controller determines if one of the plurality of packets includes a timestamp discontinuity by identifying a predetermined code placed in the arrival timestamp of the corresponding packet.

8. The apparatus of claim 6 wherein the controller alters the playback system time clock by resetting the playback system time clock to a value corresponding to an arrival timestamp of the packet for which the discontinuity was identified.

9. The apparatus of claim 6 wherein the controller alters the playback system time clock by resetting the playback system time clock to a value corresponding to an arrival timestamp of a packet arriving in the playback system subsequent to the packet for which the discontinuity was identified.

10. The apparatus of claim 6 wherein the spooler delivers a predetermined number of null packets between delivery of each of the transport packets retrieved from storage.

11. A method of playing back transport packets in a transport stream playback system comprising the steps of:

retrieving from storage each of a plurality of formatted packets, including a transport packet and a corresponding formatted arrival timestamp, the arrival timestamp indicative of an arrival time of the corresponding transport packet in a recording system used to store the formatted packets, for each formatted packet, determining that the formatted packets includes a timestamp discontinuity if a predetermined portion of the formatted packet other than the transport packet itself equals a particular, fixed, predetermined value, the determination being made for each of plural, sequentially retrieved, formatted packets using the same particular, fixed predetermined value, altering playback of each transport packets in the formatted packets determined to include a timestamp discontinuity, and delivering the transport packets in accordance with the corresponding arrival timestamp relative to an independent playback system time clock and in accordance with alterations in playback made for transport packets determined to include the timestamp discontinuity, wherein the independent playback system time clock is loaded with the arrival time stamp of the transport packet with a playback discontinuity.

12. The method of claim 11 wherein transport packets determined to have the timestamp discontinuity are discarded.

13. The method of claim 11 wherein each arrival time stamp contained in each formatted packet is formatted into a pattern of bits that is ambiguously free of a bit pattern that matches a synchronization word of the corresponding transport packet of the formatted packet.

14. A apparatus for use in playing back transport packets in a transport stream playback system, the apparatus comprising:

a controller configured for retrieving from storage each of a plurality of formatted packets, including a transport packet and a corresponding formatted arrival timestamp, the arrival timestamp indicative of an arrival time of the corresponding transport packet in a recording system used to store the formatted packets, for each formatted packet, determining that the formatted packets includes a timestamp discontinuity if a predetermined portion of the formatted packet other than the transport packet itself equals a particular, fixed, predetermined value, the determination being made for each of plural, sequentially retrieved formatted packets using the same particular, fixed predetermined value, and for altering playback of each transport packets in the formatted packets determined to include a timestamp discontinuity, and a spooler configured for delivering the transport packets in accordance with the corresponding arrival timestamp relative to an independent playback system time clock and in accordance with alterations in playback made for transport packets determined to include the timestamp discontinuity, wherein the independent playback system time clock is loaded with the arrival time stamp of the transport packet with a playback discontinuity.

15. The apparatus of claim 14 wherein transport packets determined to have the timestamp discontinuity are discarded.

16. The apparatus of claim 14 wherein each arrival time stamp contained in each formatted packet is formatted into a pattern of bits that is ambiguously free of a bit pattern that matches a synchronization word of the corresponding transport packet of the formatted packet.

\* \* \* \* \*